United States Patent [19]
Tanaka et al.

[11] Patent Number: 5,906,897
[45] Date of Patent: May 25, 1999

[54] AL METAL JOINED BODY

[75] Inventors: Tomoo Tanaka, Komaki; Masaya Ito, Nisshin, both of Japan

[73] Assignee: NGK Spark Plug Co., Ltd., Aichi-ken, Japan

[21] Appl. No.: 08/788,760

[22] Filed: Jan. 24, 1997

[30] Foreign Application Priority Data

Jan. 26, 1996 [JP] Japan ................................. 8-032917
Dec. 27, 1996 [JP] Japan ................................. 8-359102

[51] Int. Cl.$^6$ ...................................... B32B 15/04
[52] U.S. Cl. ...................... 428/627; 428/632; 428/651; 428/653; 428/654
[58] Field of Search ..................... 428/651, 653, 428/654, 698, 702, 939, 627, 632

[56] References Cited

U.S. PATENT DOCUMENTS 2,807,541 9/1957 Houldcroft ................................. 75/143
4,838,474 6/1989 Ohashi et al. ........................... 228/121

FOREIGN PATENT DOCUMENTS 0 121 209 10/1984 European Pat. Off. .
1 058 337 6/1959 Germany .
2 157 317 10/1985 United Kingdom .
2 159 176 11/1985 United Kingdom .

OTHER PUBLICATIONS

Patent Abstracts of Japan; vol. 095, No. 011, Dec. 26, 1995, & JP 07 223091 A (NHK Spring Co., Ltd.) Aug. 22, 1995, *Abstract*.

*Primary Examiner*—Paul Thibodeau
*Assistant Examiner*—Holly C. Rickman
*Attorney, Agent, or Firm*—Sughrue, Mion, Zinn, Macpeak & Seas, PLLC

[57] ABSTRACT

An Al metal joined body is formed by joining Al metal members of Al or Al alloy or by joining such Al metal member and a member of a dissimilar material. The joined body comprises a first joined member, a second joined member and a brazed joining layer interposed between the two members. The brazed joining layer has a thickness from about 50 μm to about 500 μm and comprises from 0.05% to 14% by weight of Si, from 0.05% to 11% by weight of Cu, from 0.05% to 13% by weight of Zn, from 0.05% to 4% by weight of Mg, and at least 56.5% by weight of Al.

7 Claims, 8 Drawing Sheets

↑
INITIAL
SURFACE

↑
INITIAL
SURFACE

Al

Al ALLOY | JOINING LAYER | PURE Al

100 μm

Cu

Al ALLOY | JOINING LAYER | PURE Al

100 μm

Mg

Al ALLOY | JOINING LAYER | PURE Al

100 μm

Si

Zn

Aℓ                  Cu                  Mg
  JOINING             JOINING             JOINING
ZrO₂ LAYER Aℓ ALLOY  ZrO₂ LAYER Aℓ ALLOY  ZrO₂ LAYER Aℓ ALLOY

100 μm             100 μm             100 μm

FIG. 8(A)  FIG. 8(B)  FIG. 8(C)
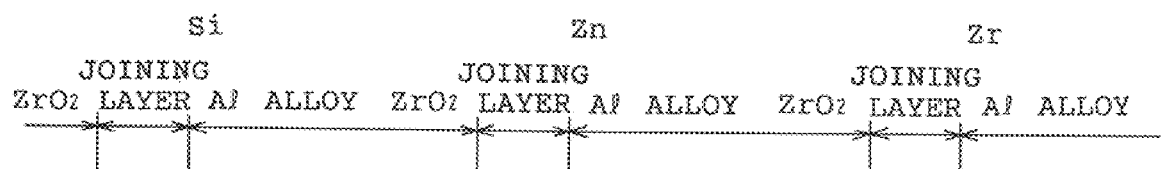
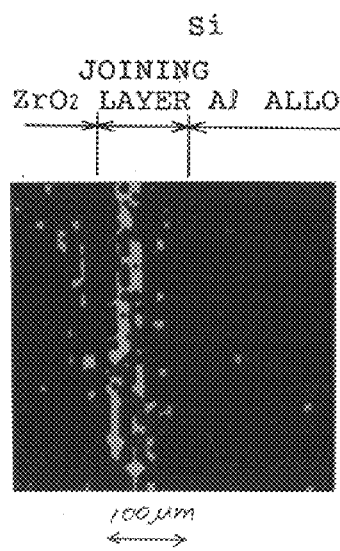 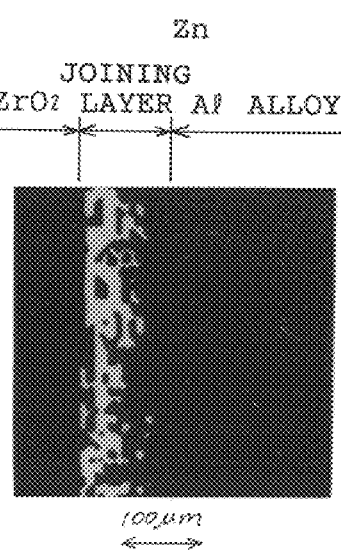 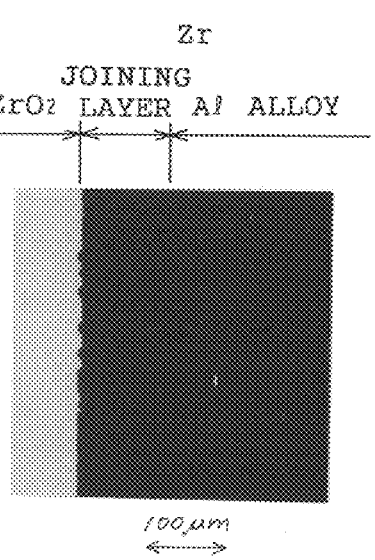

AL METAL JOINED BODY

FIELD OF THE INVENTION

This invention relates to a joined body for structural, industrial and other purposes in general, and more particularly to an Al metal joined body which is formed by joining Al metal members of Al or Al alloy or by joining the Al metal member and a member of dissimilar material.

BACKGROUND OF THE INVENTION

Conventionally, Al alloys are used in various fields, for example manufacturing of automotive heat exchangers and automotive valve train because they are light weight, superior in corrosion resistance, have high thermal conductivity and other desirable properties.

Al alloy members are joined together, or an Al alloy member is joined to another member made of a different material, by various methods, including welding, brazing, internal chilling and soldering.

In the case of brazing, JIS;BA4045 of Al—Si group, JIS;BA4145 of Al—Si—Cu group, alloy brazing material of Al—Si—Mg group and others are used as the brazing material.

When such brazing materials are used, the components of the brazing material and the joined materials are mutually diffused, thereby new intermetallic compounds are formed or foreign substances are precipitated in the joining layer formed at the joining part, i.e. close to the surface of the joined materials.

Since such intermetallic compounds or precipitated substances exists in the joining layer, the joining layer has high yield strength. However, if the intermetallic compounds or precipitated substances are too concentrated, the joining layer becomes brittle because the yield strength is too high.

Especially if an Al alloy is joined with a member made of for example a ceramic material, W alloy or Fe group alloy, whose coefficient of thermal expansion is significantly different from that of the Al alloy, the residual stress generated after the joining is so large that the buffer effect in the joining layer cannot be achieved. As a result, a fracture may occur in the intermetallic compound phase.

SUMMARY OF THE INVENTION

Wherefore, an object of this invention is to provide an Al metal joined body having high joining strength and formed by joining Al metal members made of Al or Al alloy, or by joining such Al metal member and a member of a dissimilar material.

To attain this and other objects, the first aspect of this invention provides an Al metal joined body formed by joining Al metal members made of Al or Al alloy or by joining such Al metal member and another member made of a different material, in which a joining layer is provided between the joined members. This joining layer contains mainly Al and additionally from 0.05% to 14% by weight of Si, from 0.05% to 11% by weight of Cu, from 0.05% to 13% by weight of Zn and from 0.05% to 4% by weight of Mg.

In the present invention, the Al metal member is made of pure Al or Al alloy. Therefore, the Al metal joined body is referred to as a joined body of pure Al members, a joined body of a pure Al member and an Al alloy member, a joined body of Al alloy members, a joined body of a pure Al member and a member made of a dissimilar material, or a joined body of an Al alloy member and a member made of a different material.

The joining layer is formed in a manner that the component of the brazing material or other for joining is diffused in the joined members. The joining layer and the joined members can be distinguished apparently by observing the cross section of the joined body to analyze the element distribution using, for example, EPMA.

The second aspect of the invention provides an Al metal joined body of the first aspect characterized in that the thickness of the joining layer including the initial surface of the joined members is from about 50 $\mu$m to about 500 $\mu$m.

Each member has an initial surface before joining. After joining, the initial surfaces are indicated by voids, which are formed by the irregularities remained on the initial end surfaces of the joined members or by the Kirkendall effect.

The third aspect of the invention provides an Al metal joined body of the first or second aspect characterized in that the joining layer contains mainly Al and additionally from 0.1% to 5% by weight of Si, from 0.1% to 7% by weight of Cu, from 3% to 12% by weight of Zn and from 0.05% to 4% by weight of Mg.

The fourth aspect of the invention provides an Al metal joined body of one of the first to third aspects characterized in that from 0.05% to 1.5% by weight in total amount of at least one of Mn, Fe, Cr, Ti, Mo and Ni, which are slightly added to the joined materials, are contained in the joining layer.

The fifth aspect of the present invention provides an Al metal joined body of one of the first to fourth aspects characterized in that the dissimilar material is a ceramic material.

The sixth aspect of the present invention provides an Al metal joined body of one of the first to fifth aspects characterized in that the different material is Fe alloy, Ti alloy, W alloy or Mo alloy.

The joining method used to achieve the present invention includes not only brazing, but also hot pressing and other diffusion joining methods in which a joining layer is formed.

In the present invention, even if the composition of the joining layer measured at one measurement position using an EPMA or other electronic analysis method is outside the aforementioned range, it is allowable as long as the average composition of the joining layer is within the aforementioned range. If the measurement is conducted at more than one position, namely measurement spot, and the composition is outside of the aforementioned range at one or more of the spots, it is allowable as long as the comprehensive evaluation of the measurement values, namely the average value, is within the aforementioned range.

The spot diameter, usually the diameter of a round spot, is set to be smaller than the thickness of the joining layer. For example, the spot diameter can be from 30% to 90% of the thickness of the joining layer. The number of the spots can be from 1 to 50. More than 10 spots are preferable for better measurement precision.

As aforementioned, when Al alloy is employed as a brazing material, it is considered that the joining strength is reduced due to the existence of the intermetallic compounds such as Al—Cu intermetallic compound or precipitated substances. Therefore, it is supposed that the joining strength can be increased by controlling the formation of such intermetallic compounds or precipitated substances. The inventors of the present invention conducted an experiment in which various Al alloys were joined. The strength of the joined bodies were examined, and the composition of the joining layer were analyzed.

In the experiment, when the joining strength was small, the fracture occurred in the joining layer. Additionally, the fracture surface showed that the fracture form was brittle though the fracture occurred in the metallic layer. Further, the brittle intermetallic compounds and the precipitated substances were detected from the fracture surface. Therefore, it was proved that the joining strength is controlled by the intermetallic compounds and the precipitated substances. The inventors of the present invention have found that by specifying the composition of the joining layer formed by mutual diffusion of the components of the joined members and the brazing material, the intermetallic compounds and the precipitated substances are controlled so that a joined body having high strength is obtained.

Accordingly, in the first aspect of the invention, since the joining layer contains mainly Al and from 0.05% to 14% by weight of Si, from 0.05% to 11% by weight of Cu, from 0.05% to 13% by weight of Zn and from 0.05% to 4% by weight of Mg, the excessive formation of the brittle intermetallic compounds and the precipitated substances is prevented, while the yield strength of the joining layer is increased. As a result, the joining strength is enhanced. On the other hand, if any of the components exceeds the aforementioned range, the excessive formation of the brittle intermetallic compounds and the precipitated substances lowers the joining strength. If any of the components is below the aforementioned range, sufficient effect cannot be achieved.

In the second aspect of the invention, a high joining strength can be achieved since the thickness of the joining layer including the initial surfaces of the joined members is from 50 $\mu$m to 500 $\mu$m.

The thickness of the joining layer including the initial surfaces, which varies according to the materials of the joined members, is within the predetermined range. For example, when two metal members are joined, the joining layer extends equally from the initial surfaces so that the initial surfaces are approximately centered in the joining layer. When a metal member and a ceramic member is joined, the initial surfaces in the joining layer are closer to the ceramic member.

In the third aspect of the invention, since the joining layer contains mainly Al and from 0.1% to 5% by weight of Si, from 0.1% to 7% by weight of Cu, from 3% to 12% by weight of Zn and from 0.05% to 4% by weight of Mg, a joined body with higher strength can be provided.

In the fourth aspect of the invention, since the joining layer contains from 0.05% to 1.5% by weight in total of at least one of Mn, Fe, Cr, Ti, Mo, and Ni, which are slightly added to the material of the joined members, an appropriate amount of the intermetallic compounds and the precipitated substances are produced. Therefore, the joining layer exhibits preferable hardness and joining strength.

In the fifth aspect of the invention, since a ceramic material is used as the dissimilar material, a composite material having high joining strength can be provided.

In the sixth aspect of the invention, since the dissimilar material is selected from Fe alloy, Ti alloy, W alloy and Mo alloy, a metal joined body having high joining strength can be provided.

BRIEF DESCRIPTION OF THE DRAWINGS

FIGS. 8(A)–8(C) are photomicrographs by EPMA element distribution showing the metallic composition of the Al metal joined body of the second embodiment.

DETAILED DESCRIPTION OF THE PREFERRED EMBODIMENTS

Embodiments of the present invention will now be explained with reference to FIGS. 1–8.

EMBODIMENT 1

Figure 1:
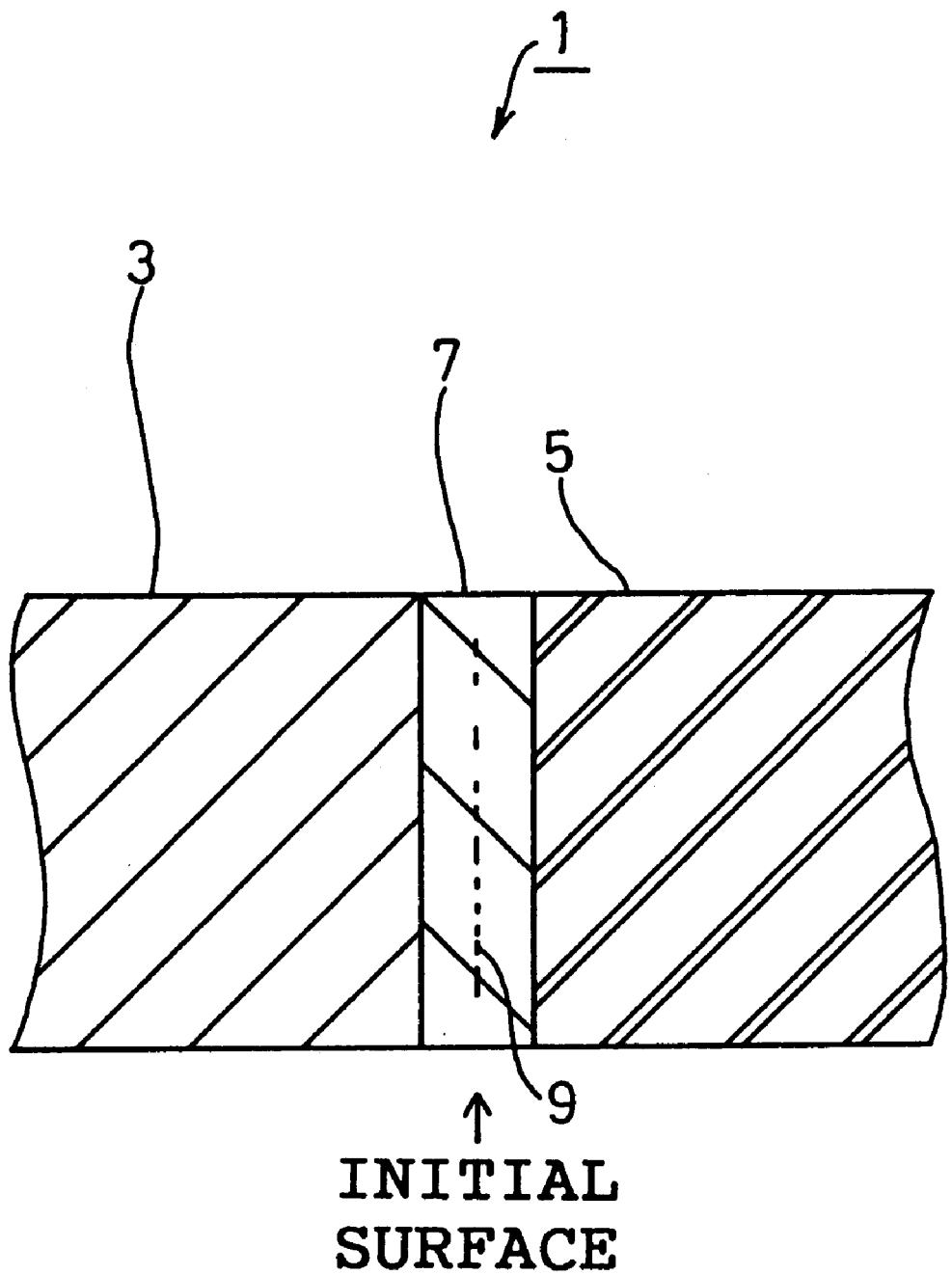
FIG. 1 is a sectional view showing the Al metal joined body of the first embodiment.

As shown in FIG. 1, the Al metal joined body 1, which is hereinafter referred to as a joined body 1, comprises a first joined member 3, a second joined member 5, and a joining layer 7 formed by brazing between these members.

Both the first and second joined members 3 and 5 are made of Al or Al alloy. For example the first joined member 3 is made of JIS;A1050 of pure Al, and the second joined member 5 is made of JIS;A5083 of Al alloy.

The joining layer 7 for joining the joined members 3 and 5 has the thickness of approximately from 50 $\mu$m to 500 $\mu$m. Voids 9 indicating the initial surface is approximately centered in the joining layer 7.

The initial surfaces are the ends of the joined members 3 and 5 before brazing. The voids 9 on the initial surfaces are formed by the remained irregularities on the initial end surfaces of the joined members 3 and 5 or by the Kirkendall effect.

The joining layer 7 is formed in a manner such that the components of the brazing material and the members to be joined are mutually diffused by the thermal treatment in the brazing process. Accordingly, the components of the joining layer 7 may be contained in the brazing material in advance, or may be diffused from the Al alloy composing the joined members 3 and 5. Alternatively, a metallized layer containing the components of the joining layer 7 may be formed on the surface of the first member 3 and/or the second member 5 by plating, vacuum evaporation, spattering and the like so that by the thermal treatment in the brazing process, the components of the metallized layer are diffused into the joined members 3 and 5. That is, the components of the metallized layer can be diffused into the joined members 3 and 5 to form the joining layer 7.

Any method may be used so long as the composition of the joining layer 7 formed by the brazing is within the range prescribed by the present invention.

Depending on the composition of the members 3 and 5, the brazing material is selected so that the composition of the joining layer 7 is within the range of the present invention. The brazing material is positioned between the members 3 and 5, and then is heated at a predetermined temperature for brazing. At this time, a metallized layer as aforementioned can be formed as aforementioned to control the composition.

For determining the composition of the joining layer 7, the method using EPMA or EDS/WDS attached for SEM can be employed.

EMBODIMENT 2

The Al metal joined body of the second embodiment is formed in a manner such that a member made of Al or Al alloy is brazed with another member made of a dissimilar material.

Figure 2:
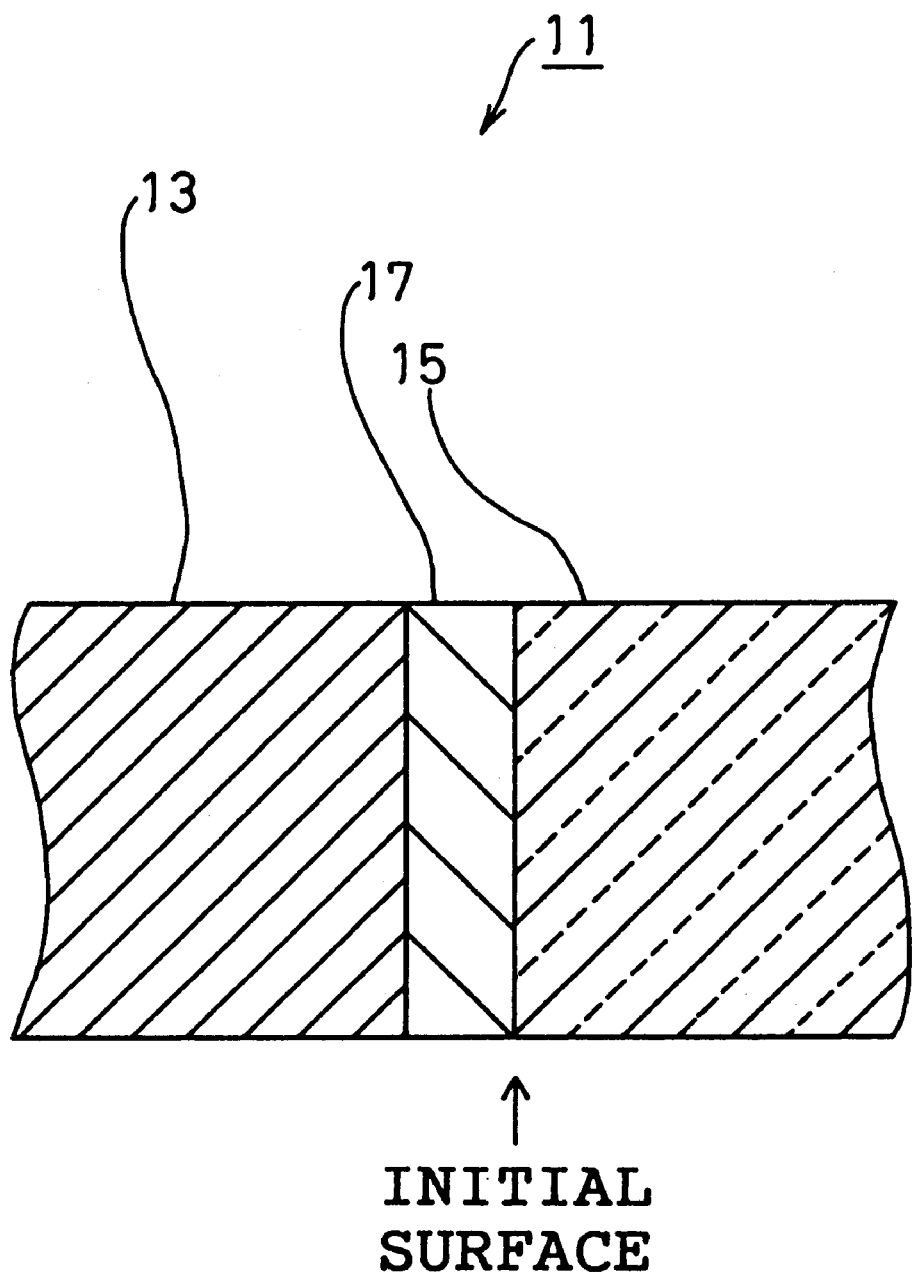
FIG. 2 is a sectional view showing the Al metal joined body of the second embodiment.

As shown in FIG. 2, the joined body 11 of the second embodiment comprises a first joined member 13, a second joined member 15 and a joining layer 17 between them.

The first joined member 13 is made of Al or Al alloy. In this embodiment, an Al alloy, for example JIS;A5052, is employed.

The second joined member 15 is made of a dissimilar material, for example an alloy or a ceramic material. In this embodiment, a ceramic material, for example $ZrO_2$, is employed.

The thickness of the joining layer 17 for joining the members 13 and 15 is approximately from 50 μm to 500 μm. The joining layer 17 is formed in a manner such that the components of the brazing material and the first joined member 13 are mutually diffused by the thermal treatment in the brazing process.

Therefore, as in the first embodiment, the components of the joining layer 17 may be contained in the brazing material in advance or diffused from the Al alloy composing the first joined member 13. Alternatively, a metallized layer containing the components of the joining layer 17 may be formed on the surface of the first joined member 13 and/or the second joined member 15 by plating, vacuum evaporation, spattering and the like so that by the thermal treatment in the brazing process the components of the metallized layer is diffused.

Like the first embodiment, depending on the composition of the joined members 13 and 15, the brazing material is selected so that the composition of the joining layer 17 is within the range prescribed by the present invention. The brazing material is placed between the members 13 and 15 and then heated at a predetermined temperature for brazing. To enhance the joining efficiency with the ceramic material and to control the joining layer composition, a metallized layer is preferably formed on the end surface of the second member 15 of the ceramic material.

Experiment 1

In the first experiment, the joined bodies of the first and second embodiments were prepared as the samples. For preparing the first members to be joined, JIS;A2017, A2024, A5052, A5083, A7075, AC4B and AC8A of Al alloy and JIS;A1050 of pure Al were used as illustrated in the following TABLE 1. For preparing the second members to be joined, Al alloys, pure Al, ceramic materials and dissimilar metal materials were used. As the pure Al, JIS; A1050 was used. As the Al alloys, JIS;A2017, A5052, AC8A, AC4B and A7075 were used. As the ceramic materials, $Si_3N_4$, $ZrO_2$ and $Al_2O_3$ were used. As the dissimilar metal materials, Ti alloy (JIS; TAB6400) and W alloy (W-10Cu) were used. Each of the members to be joined were in a cylindrical form with the diameter being 12 mm and the length being 60 mm.

In this experiment, the samples with a metallized layer formed on the surface of the second member in advance and the samples without such a metallized layer were prepared.

In case the second member was a ceramic material, the metallized layer was a triplex layer composed of 0.1 μm each of Ti, Mo and Ni in order from the ceramic material side, or a monolayer of 0.2 μm of Al. Especially when the ceramic material was $Al_2O_3$, after printing the Mo-Mn type metallizing paste on the surface of the ceramic material, the ceramic material was heat-treated, and then metallized layer was coated with 5 μm of Ni by electroplating. In case the second member is a metal material, the surface of the metal material was coated with 5 μm of Ni by electroplating.

For the brazing materials, JIS;BA4045(Al-10Si), 4145 (Al-10Si-4Cu), BA4003(Al-8Si-3Mg), Al-27Cu-5Si, Al-22Cu-4Si-60Zn, Al-14Cu-3Si-65Zn and Al-5.4Cu-0.9Si-80Zn were used. The thickness of each brazing material was about 60 μm.

The members were joined by brazing using the brazing materials under the conditions as shown in TABLE 1. The obtained joined bodies were processed in the form for the tensile strength test. After conducting the tensile strength test, the samples were cut perpendicularly to its joined surface for determining the composition of the joining layer using the EPMA as the same with the first embodiment. Further, the thickness of the joining layer of each at the cut surface was measured based on the SEM image and the EPMA element distribution analysis. The result of the experiment is shown in the TABLE 2.

TABLE 1

| | SAMPLE NO. | FIRST MEMBER | SECOND MEMBER | METALLIZED LAYER | BRAZING MATERIAL | THERMAL TREATMENT CONDITION | |
|---|---|---|---|---|---|---|---|
| | | | | | | TEMPERATURE [° C.] | TIME [min] |
| EMBODIMENT | 1 | A1050 | A2017 | None | BA 4045 | 600 | 120 |
| | 2 | A5052 | A2017 | None | BA 4145 | 590 | 120 |
| | 3 | A1050 | A5052 | None | BA 4003 | 590 | 120 |
| | 4 | AC8A | AC8A | Ni Plating | Al—27Cu—5Si | 540 | 120 |
| | 5 | AC4B | AC4B | None | Al—22Cu—4Si—60Zn | 520 | 120 |
| | 6 | A7075 | A5052 | None | Al—14Cu—3Si—65Zn | 500 | 60 |
| | 7 | A1050 | A7075 | None | Al—14Cu—3Si—65Zn | 500 | 60 |
| | 8 | A1050 | A5052 | None | Al—14Cu—3Si—65Zn | 500 | 60 |
| | 9 | A2024 | A1050 | None | Al—14Cu—3Si—65Zn | 500 | 60 |
| | 10 | A2024 | A7075 | None | Al—14Cu—3Si—65Zn | 500 | 60 |
| | 11 | AC8A | W Alloy | Ni Plating | Al—22Cu—4Si—60Zn | 520 | 120 |
| | 12 | AC4B | A1203 | Mo, Mn + Ni Plating | Al—27Cu—5Si | 540 | 120 |

TABLE 1-continued

| SAMPLE NO. | FIRST MEMBER | SECOND MEMBER | METALLIZED LAYER | BRAZING MATERIAL | THERMAL TREATMENT CONDITION TEMPERATURE [° C.] | TIME [min] |
|---|---|---|---|---|---|---|
| | 13 | A2017 | Ti Alloy | Ni Plating | Al—27Cu—5Si | 540 | 120 |
| | 14 | A1050 | ZrO$_2$ | Ti, Mo, Ni | Al—27Cu—5Si | 540 | 120 |
| | 15 | A5052 | ZrO$_2$ | Al | Al—5.4Cu—0.9Si—80Zn | 500 | 60 |
| | 16 | A7075 | Si$_3$N$_4$ | Al | Al—5.4Cu—0.9Si—80Zn | 500 | 60 |
| | 17 | A5083 | ZrO$_2$ | Al | Al—5.4Cu—0.9Si—80Zn | 500 | 60 |
| | 18 | A1050 | A1050 | None | Al—27Cu—5Si | 540 | 120 |
| REFERENCE | 19 | A5052 | A2017 | None | BA 4145 | 585 | 30 |
| | 20 | A7075 | A5052 | None | Al—14Cu—3Si—80Zn | 470 | 60 |
| | 21 | A2017 | Ti Alloy | Ni Plating | Al—27Cu—5Si | 530 | 60 |
| | 22 | A5083 | ZrO$_2$ | Al | BA 4003 | 600 | 15 |
| | 23 | AC8A | AC8A | None | Al—27Cu—5Si | 540 | 10 |

TABLE 2

| | SAMPLE NO. | JOINING LAYER COMPOSITION [% BY WEIGHT] | | | | | TENSILE STRENGTH [kgf/mm$^2$] | JOINING LAYER THICKNESS[μm] |
| | | Al | Si | Cu | Zn | Mg | other | | |
|---|---|---|---|---|---|---|---|---|---|
| EMBODIMENT | 1 | rest | 6.2 | 3.2 | 0.2 | 0.3 | 0.8 | 10.1 | 450 |
| | 2 | rest | 8.4 | 4.6 | 0.3 | 2.6 | 1.2 | 24.3 | 380 |
| | 3 | rest | 3.1 | 0.1 | 0.1 | 3.5 | 0.6 | 9.8 | 370 |
| | 4 | rest | 9.0 | 5.7 | 0.2 | 1.4 | 1.4 | 17.7 | 140 |
| | 5 | rest | 7.2 | 5.3 | 4.5 | 0.4 | 1.3 | 16.8 | 480 |
| | 6 | rest | 0.5 | 1.7 | 8.1 | 2.3 | 0.9 | 27.3 | 195 |
| | 7 | rest | 0.1 | 0.8 | 4.2 | 0.3 | 1.2 | 9.9 | 120 |
| | 8 | rest | 0.2 | 2.2 | 5.9 | 0.9 | 0.4 | 10.2 | 130 |
| | 9 | rest | 0.5 | 4.3 | 4.0 | 1.6 | 0.5 | 10.5 | 128 |
| | 10 | rest | 4.4 | 5.3 | 2.1 | 3.5 | 0.9 | 26.6 | 189 |
| | 11 | rest | 12.6 | 6.8 | 4.1 | 0.2 | 0.6 | 16.7 | 87 |
| | 12 | rest | 13.4 | 1.5 | 1.0 | 0.3 | 1.2 | 15.8 | 60 |
| | 13 | rest | 7.1 | 10.8 | 0.1 | 0.3 | 1.4 | 24.2 | 57 |
| | 14 | rest | 2.3 | 9.5 | 0.1 | 0.1 | 1.3 | 10.9 | 63 |
| | 15 | rest | 0.6 | 2.3 | 10.6 | 1.2 | 0.5 | 24.8 | 115 |
| | 16 | rest | 0.7 | 3.7 | 12.9 | 0.1 | 0.8 | 26.5 | 123 |
| | 17 | rest | 0.8 | 1.9 | 7.0 | 2.8 | 0.8 | 23.8 | 120 |
| | 18 | rest | 2.4 | 9.8 | 0.05 | 0.05 | 0.2 | 12.1 | 101 |
| REFERENCE | 19 | rest | 14.8 | 6.2 | 0.3 | 2.9 | 1.6 | 5.3 | 45 |
| | 20 | rest | 2.3 | 11.9 | 13.2 | 2.8 | 1.8 | 6.4 | 103 |
| | 21 | rest | 7.5 | 12.3 | 14.3 | 0.2 | 1.9 | 5.8 | 39 |
| | 22 | rest | 3.9 | 0.3 | 0.2 | 4.6 | 1.6 | 4.2 | 44 |
| | 23 | rest | 9.8 | 10.3 | 0.2 | 5.1 | 2.0 | 3.6 | 44 |

As obvious from the TABLES 1 and 2, each of the joined bodies illustrated as samples 1–18 in the TABLES, including a joining layer whose composition is within the range of the present invention, has the tensile strength approximately equal to that of the joined members. In addition, the fracture form was ductile, without depending on the composition of the joined members or the brazing material.

Contrarily, each of the joined bodies of the references (samples 19–23 in the TABLES) having a joining layer composition outside of the range of the present invention, has a tensile strength far lower than that of the joined members themselves, and the fracture form was brittle, even though the same joined members and brazing materials as those formed in samples 1–18 were used.

The difference of the strength in this experiment is caused not only by the compositions of the joined members and the brazing materials, but also by adjusting the brazing temperature and the brazing time for forming the joining layer. In this way, the formation of the intermetallic compounds within the joining layer can be controlled.

Experiment 2

In the second experiment, the joined bodies of the first and the second embodiments were prepared as the samples. Each of the joined bodies was cut along its axis. A photograph of the cut surface was taken through SEM at ×150 magnification. The cut surface was analyzed by EPMA and a photograph was taken at ×150 magnification. EPMA is generally used for analyzing the distribution of particular components in metal materials and the like. In this experiment, the joined bodies were cut along its axis and each cut surface was exposed to a beam for EPMA analysis. For element distribution analysis, the cut surface was analyzed at an extremely short spot diameter (beam diameter). For composition analysis, the beam diameter is slightly shorter than the thickness of the joining layer.

Figure 3:
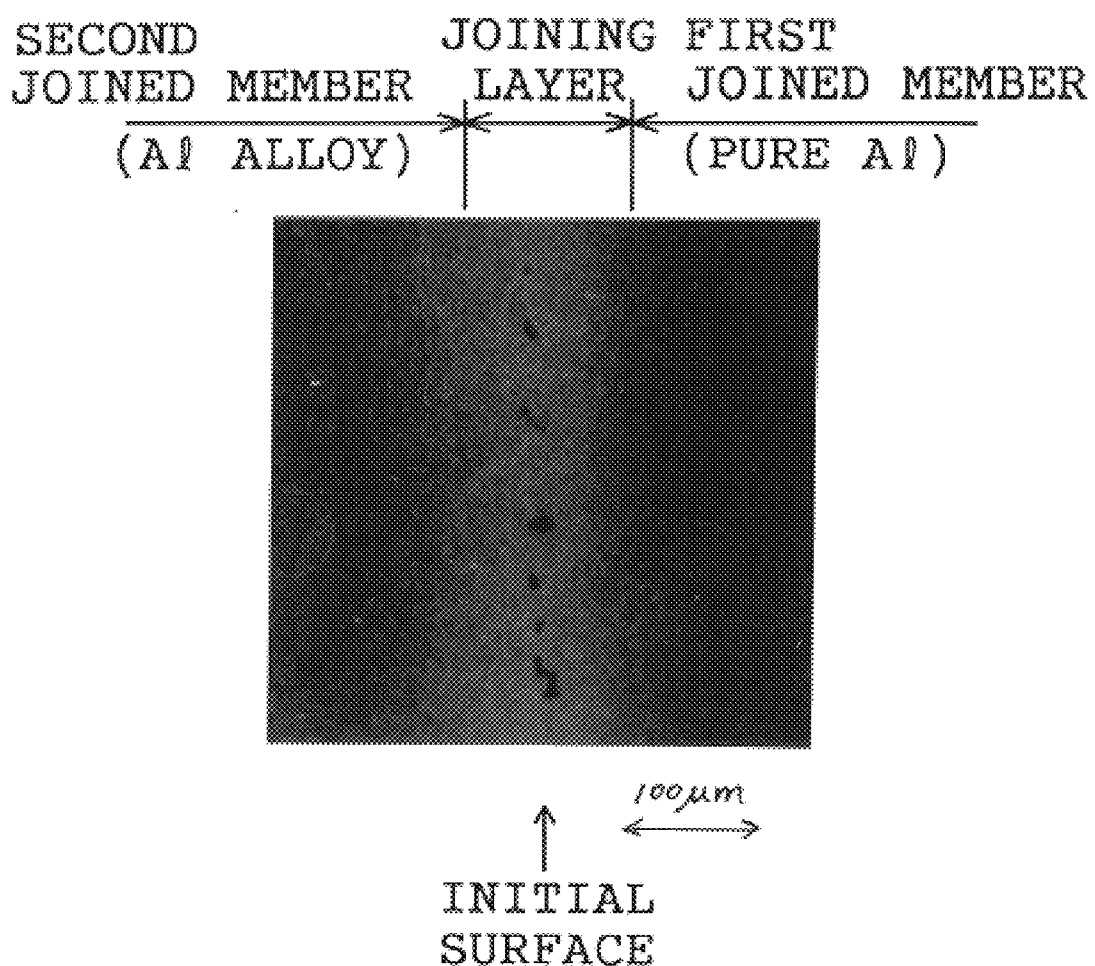
FIG. 3 is a photomicrograph by SEM showing the metallic composition of the Al metal joined body of the first embodiment.
Figure 4A:
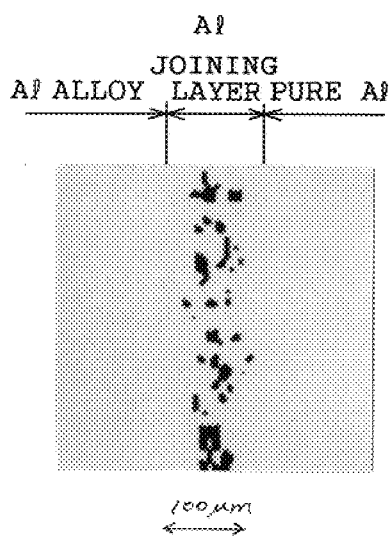
FIGS. 4(A)–4(C) are photomicrographs by EPMA element distribution showing the metallic composition of the Al metal joined body of the first embodiment.
Figure 4B:
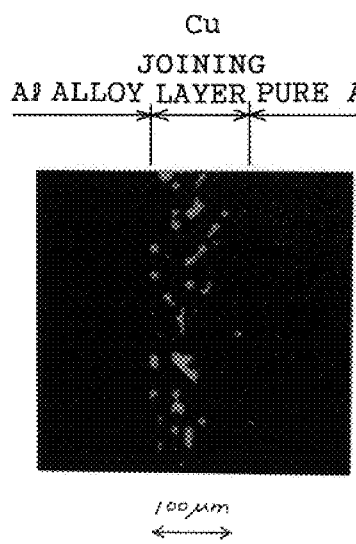
Figure 4C:
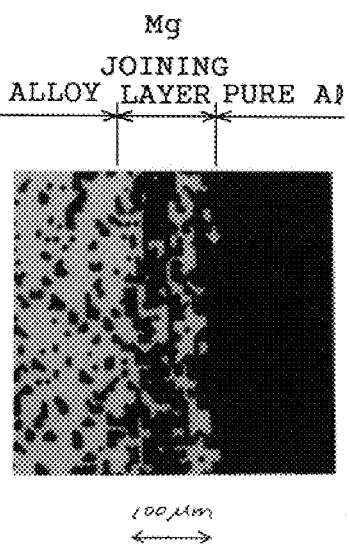
Figure 5A:
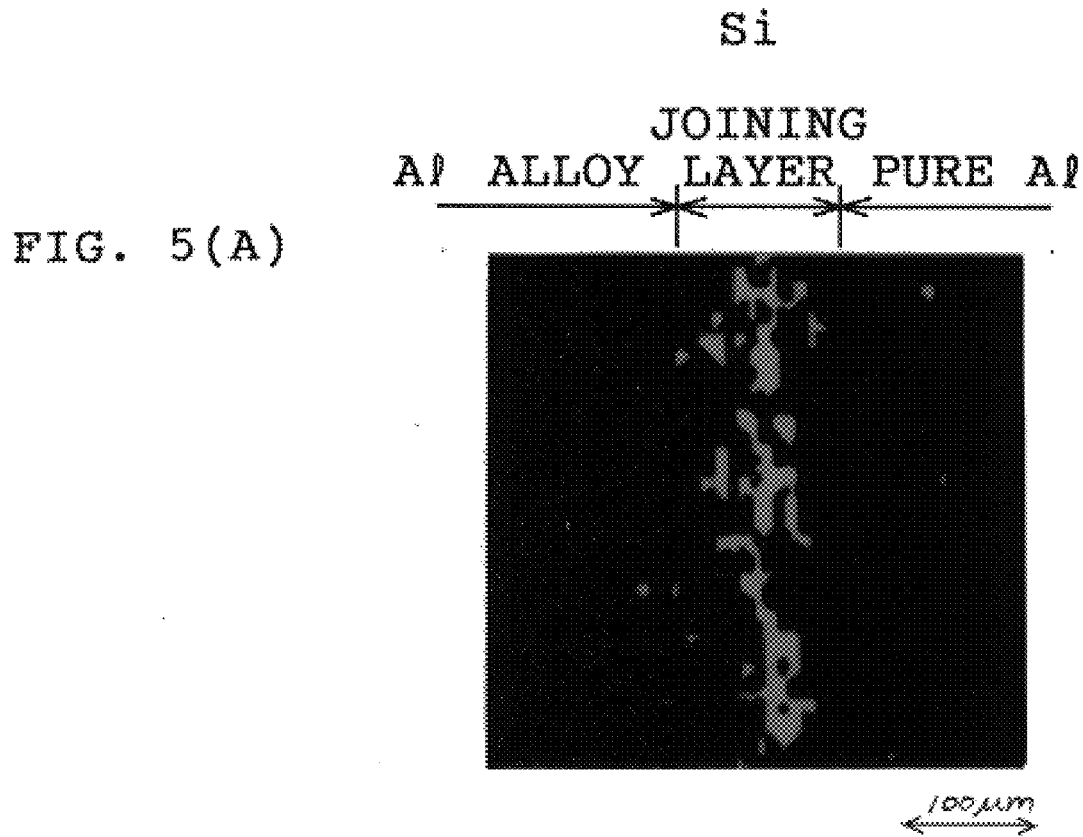
FIGS. 5(A) and 5(B) are photomicrographs by EPMA element distribution showing the metallic composition of the Al metal it joined body of the first embodiment.
Figure 5B:
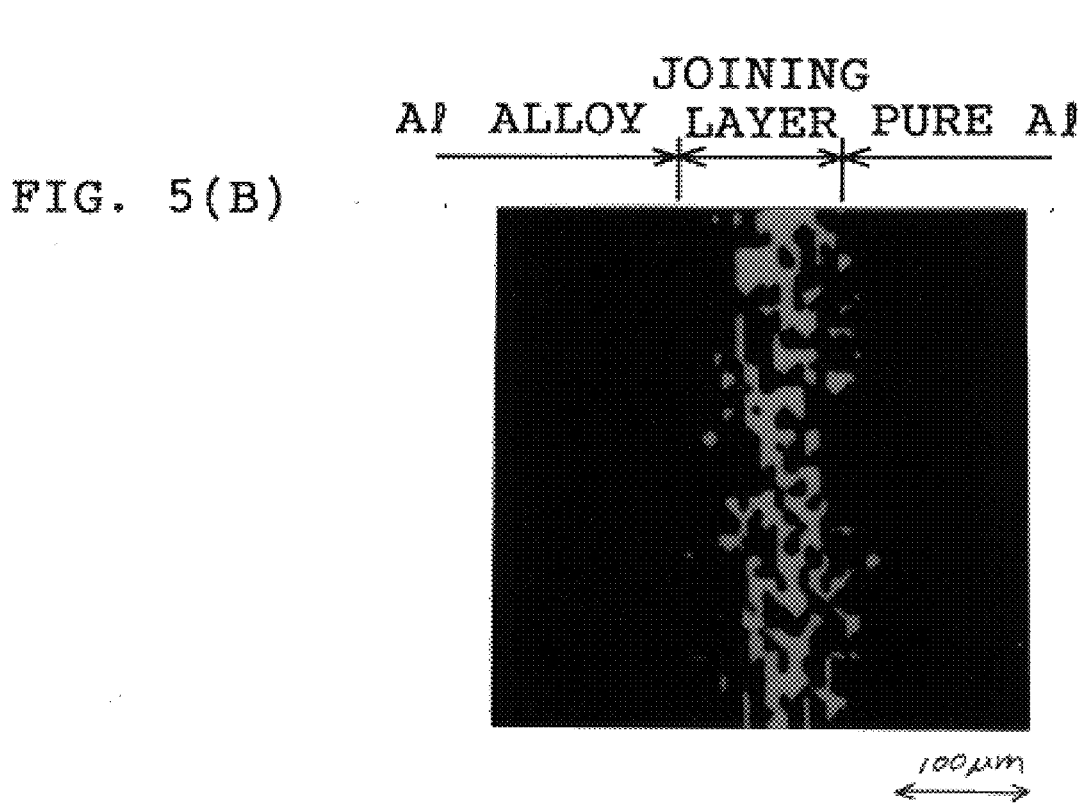

FIG. 3 is a SEM photograph showing the metallic composition of the joined body of the first embodiment sample No. 8. FIGS. 4 and 5 are photographs showing the metallic composition according to the element distribution analysis by EPMA taken at the same position with FIG. 3. FIG. 4(A) shows the distribution of Al. FIG. 4(B) shows the distribution of Cu. FIG. 4(C) shows the distribution of Mg. FIG. 5(A) shows the distribution of Si. FIG. 5(B) shows the distribution of Zn. The white parts in FIGS. 4 and 5 show the existence of each elements. In FIGS. 3–5, the left of the joining layer is the second joined material made of Al alloy (JIS;A5052), and the opposite is the first joined material made of pure Al (JIS;A1050).

Figure 6:
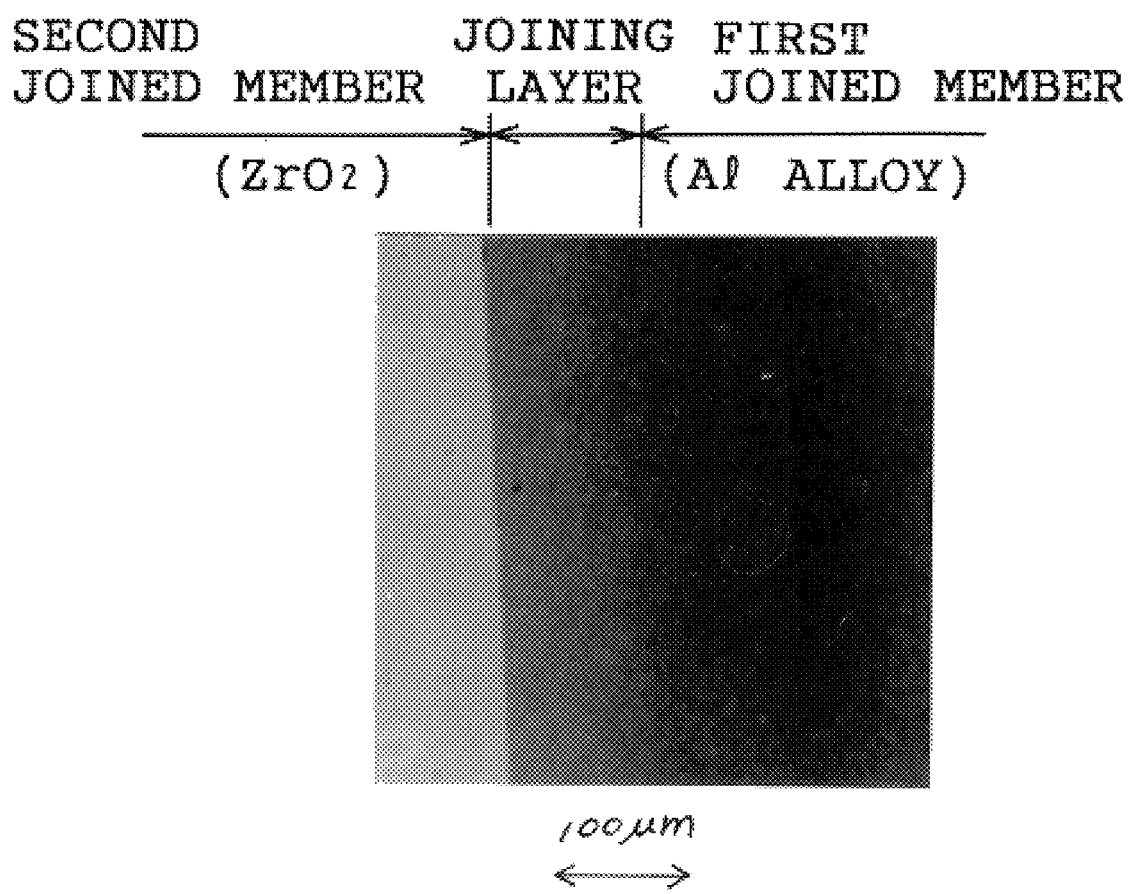
FIG. 6 is a photomicrograph by SEM showing the metallic composition of the Al metal joined body of the second embodiment.
Figure 7A:
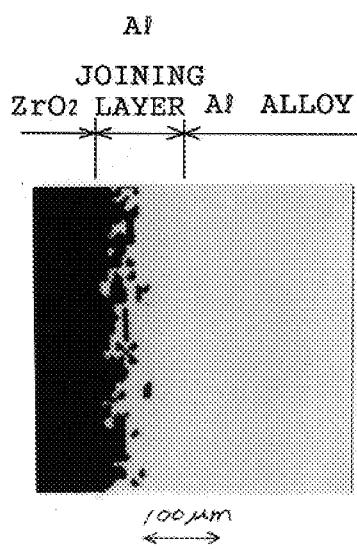
FIGS. 7(A)–7(C) are photomicrographs by EPMA element distribution showing the metallic composition of the Al metal joined body of the second embodiment.
Figure 7B:
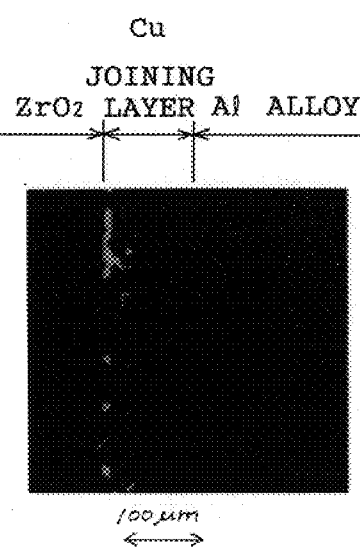
Figure 7C:
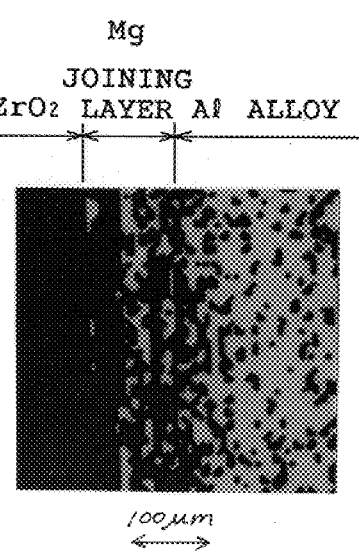

FIG. 6 is a SEM photograph showing the metallic composition of the joined body of the second embodiment sample No. 17. FIGS. 7 and 8 are photographs showing the metallic composition according to the element distribution analysis by EPMA taken at the same position with FIG. 6. FIG. 7(A) shows the distribution of Al. FIG. 7(B) shows the distribution of Cu. FIG. 7(C) shows the distribution of Mg. FIG. 8(A) shows the distribution of Si. FIG. 8(B) shows the distribution of Zn. FIG. 8(C) shows the distribution of Zr. The white parts in FIGS. 7 and 8 shows the existence of each elements. In FIGS. 6–8, the left of the joining layer is the second joined material made of a ceramic material (ZrO2), and the opposite is the first joined material made of Al alloy (JIS;A5083).

As obvious from the observation and analysis in these experiments, a joining layer having a predetermined thickness is formed between the first and second joined members. Due to the existence of such joining layer, a high joining strength can be obtained.

Experiment 3

In the third experiment, the samples 24 and 25, which were the same with the samples 8 and 17 respectively excepting that the thickness of the brazing material was 40 μm and the brazing time was 15 minutes, were used. Other conditions were the same as in the first experiment. The conditions and the result of the experiment are shown in TABLES 3 and 4, respectively.

composition or the thickness of the metallized layer formed on the joining surface of the joined members may be selected, the temperature and time for joining may be selected, or the above selections may be combined so that the composition of the joining layer is within the range of the present invention.

Furthermore, the present invention is applicable to joined bodies formed by diffusion joining, for example solid phase diffusion joining by hot pressing or solid and liquid phase diffusion joining.

In case a flux is used in brazing the joined members, the flux unavoidably remains in the joining layer after brazing. Generally the remaining flux deteriorates corrosion resistance or other performances. However, even if the flux components (K, Na, Li, F, Cl, Sr, Cs or other) is contained in the joining layer, the adequate joining can be achieved so long as the composition of the joining layer is within the range of the present invention. As described above, the Al metal joined body of the present invention is formed by joining Al metal members made of Al or Al alloy, or by joining such Al metal member and a member made of a dissimilar material. By forming a joining layer having predetermined composition between the joined members, a joined body having high strength can be obtained.

This invention has been described above with reference to the preferred embodiments as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

TABLE 3

| | SAMPLE NO. | FIRST MEMBER | SECOND MEMBER | METALLIZED LAYER | BRAZING MATERIAL | THERMAL TREATMENT CONDITION | |
|---|---|---|---|---|---|---|---|
| | | | | | | TEMPERATURE [° C.] | TIME [min] |
| EMBODIMENT | 24 | A1050 | A5052 | None | Al—14Cu—3Si—65Zn | 500 | 15 |
| | 25 | A5083 | ZrO$_2$ | Al | Al—5.4Cu—0.9Si—80Zn | 500 | 15 |

TABLE 4

| | SAMPLE NO. | JOINING LAYER COMPOSITION [% BY WEIGHT] | | | | | TENSILE STRENGTH [kgf/mm$^2$] | JOINING LAYER THICKNESS[μm] |
|---|---|---|---|---|---|---|---|---|
| | | Al | Si | Cu | Zn | Mg | other | | |
| EMBODIMENT | 24 | rest | 0.5 | 5.8 | 9.4 | 1.3 | 0.2 | 8.4 | 320 |
| | 25 | rest | 0.7 | 3.5 | 10.6 | 1.9 | 0.3 | 12.1 | 28 |

As obvious from the TABLES 3 and 4, each of the joined members illustrated as samples 24 and 25 in the TABLES, whose joining layer has the composition within the range of the present invention, shows sufficient strength. In addition, the fracture form was ductile, without depending on the composition of the joined members or the brazing material.

The joined members of the third experiment have the higher strength than those of the references each having a joining layer whose composition is outside of the range of the present invention. However, the joined members of the third experiment are less strong than the samples 8 and 17 of the first experiment because of the thinner joining layers.

The composition of the material of the first and/or the second joined members may be selected, the composition or the thickness of the brazing material may be selected, the

What is claimed is:

1. An Al metal joined body comprising:

two joined members, the first joined member being fabricated from material selected from the group consisting of Al and Al alloy, and the second joined member being fabricated from material selected from the group consisting of Al, Al alloy and a dissimilar material; and a brazed joining layer forming a brazed joint between the two joined members, said brazed joining layer including,
   i) from 0.05% to 14% by weight of Si,
   ii) from 0.05% to 11% by weight of Cu,
   iii) from 0.05% to 13% by weight of Zn, iv) from 0.05% to 4% by weight of Mg, and v) at least 56.5% by weight of Al.

2. An Al metal joined body of claim 1, wherein the thickness of the brazed joining layer of the joined members is from 50 μm to 500 μm.

3. An aluminum metal joined body according to claim 1, wherein the brazed joining layer comprises:

from 0.1% to 5% by weight of Si, from 0.1% to 7% by weight of Cu, from 3% to 12% by weight of Zn, from 0.05% to 4% by weight of Mg, and at least 70.5% by weight of Al.

4. An Al metal joined body according to claim 1, wherein the brazed joining layer includes at least one of Mn, Fe, Cr, Ti, Mo and Ni from about 0.05% to about 1.5% by weight in total.

5. An Al metal joined body according to claim 1, wherein the dissimilar material is a ceramic material.

6. An Al metal joined body according to claim 5, wherein the ceramic material is one of $Al_2O_3$, $ZrO_2$ and $Si_3N_4$.

7. An Al metal joined body according to claim 1, wherein the dissimilar material is one of Fe alloy, Ti alloy, W alloy and Mo alloy.

* * * * *